United States Patent
Hara

(10) Patent No.: US 7,775,453 B2
(45) Date of Patent: Aug. 17, 2010

(54) VEHICLE AIR-CONDITIONER CONTROL SYSTEM

(75) Inventor: Junichiro Hara, Ashikaga (JP)

(73) Assignee: Calsonic Kansei Corporation, Tokyo (JP)

( * ) Notice: Subject to any disclaimer, the term of this patent is extended or adjusted under 35 U.S.C. 154(b) by 817 days.

(21) Appl. No.: 11/575,867

(22) PCT Filed: Sep. 5, 2006

(86) PCT No.: PCT/JP2006/017528

§ 371 (c)(1),
(2), (4) Date: Mar. 22, 2007

(87) PCT Pub. No.: WO2007/029685

PCT Pub. Date: Mar. 15, 2007

(65) Prior Publication Data

US 2009/0193825 A1 Aug. 6, 2009

(30) Foreign Application Priority Data

Sep. 5, 2005 (JP) ............................. 2005-256383

(51) Int. Cl.
*G05D 23/00* (2006.01)
*B60H 1/32* (2006.01)
*B61D 27/00* (2006.01)
(52) U.S. Cl. ............................. 236/51; 62/244; 165/42
(58) Field of Classification Search .................. 62/132, 62/244; 236/51; 165/42
See application file for complete search history.

(56) References Cited

U.S. PATENT DOCUMENTS

| 5,305,613 A | 4/1994 | Hotta et al. |
| 5,361,593 A | 11/1994 | Dauvergne |
| 5,524,446 A | 6/1996 | Hotta et al. |
| 5,572,881 A | 11/1996 | Hotta et al. |
| 2004/0185764 A1 | 9/2004 | Ichishi et al. |
| 2004/0200228 A1 | 10/2004 | Yanagimachi et al. |
| 2006/0046684 A1 | 3/2006 | Kameyama |

FOREIGN PATENT DOCUMENTS

| JP | 61-174250 U | 10/1986 |
| JP | 62-8814 A | 1/1987 |
| JP | 5-147420 A | 6/1993 |
| JP | 6-48167 A | 2/1994 |
| JP | 11-139155 A | 5/1999 |
| JP | 2002-264635 A | 9/2002 |
| JP | 2004-256092 A | 9/2004 |
| JP | 2004-314720 A | 11/2004 |
| JP | 2006-69296 A | 3/2006 |
| WO | WO 03/055707 A1 | 7/2003 |

*Primary Examiner*—Chen-Wen Jiang
(74) *Attorney, Agent, or Firm*—Foley & Lardner LLP

(57) ABSTRACT

A vehicle air-conditioner control system according to the present invention activates an air conditioner in response to a command from an air-conditioner remote controller before a passenger is onboard, controls the air conditioner based on a heat load detected by a heat load detector, controls the air conditioner to be set in a silent mode so as not to make the passenger feel uncomfortable due to an air-conditioning wind when a passenger-proximity determiner determines that the passenger is proximate to the vehicle.

10 Claims, 14 Drawing Sheets

HEAT LOAD INDEX (TARGET AIR-MIX-DOOR OPENING)

VEHICLE AIR-CONDITIONER CONTROL SYSTEM

TECHNICAL FIELD

The present invention relates to a vehicle air-conditioner control system that air-conditions a vehicle by remote control before a passenger boards the vehicle, and more particularly relates to a vehicle air-conditioner control system that executes control of air-conditioning so as not to make a passenger feel uncomfortable with air-conditioning wind by changing over an air-conditioning mode to a silent mode particularly when the passenger is proximate to the vehicle.

BACKGROUND ART

There is conventionally known a technique for performing air conditioning of a vehicle by remote control. It is disclosed, for example, in Japanese Utility Model Application Laid-Open No. 61-174250 to activate an air-conditioning unit or the like before arrival of a passenger at a vehicle by remote-controlling vehicle equipment over a telephone outside the vehicle.

Furthermore, it is disclosed in Japanese Patent Application Laid-Open No. 5-147420 to calculate a passenger boarding time, activate an air-conditioner prior to the boarding time, and control the air-conditioner to set a temperature for air-conditioning to a target temperature at the boarding time.

Moreover, it is disclosed in Japanese Patent Application Laid-Open No. 11-139155 to exercise pre-control over air conditioning by remote control so as to be able to sufficiently ventilate a vehicle compartment before air-cooling the compartment and to cool the compartment within short time.

Further, it is disclosed in Japanese Patent Application Laid-Open No. 2004-256092 to suppress waste of power consumption by selecting one of air-conditioning using refrigeration cycle and ventilation of a vehicle compartment when the vehicle compartment is air-conditioned by remote control.

DISCLOSURE OF THE INVENTION

However, none of the conventional air-conditioners described above have given due consideration to air-conditioning comfort when a passenger boards the vehicle. For example, according to the conventional techniques disclosed in the Japanese Utility Model Application Laid-Open No. 61-174250, and the Japanese Patent Application Laid-Open Nos. 5-147420 and 11-139155, the passenger is forced to board a vehicle space in which air-conditioning wind blows hard. The air-conditioning wind may strike against regions of the passenger's body other than those to which the air-conditioning wind is to be directed, making the passenger disadvantageously feel uncomfortable. Furthermore, much air in the air-conditioned compartment may disadvantageously flow to the outside of the compartment. Moreover, if the air conditioner operates in a case where a capacity of a compressor is relatively large, noise of the compressor may reach to the compartment, making the passenger disadvantageously feel uncomfortable.

Furthermore, according to the conventional technique disclosed in the Japanese Patent Laid-Open No. 2004-256092, the air-conditioner is set to finish operating when the passenger boards the vehicle. Since the air conditioning finishes operating after the passenger boards the vehicle until the air-conditioner operates again, the vehicle may be insufficiently air-conditioned in an environment in which heat load is strict, making the passenger disadvantageously feel uncomfortable.

The present invention has been achieved in view of the above problems. According to the present invention, it is possible to provide a vehicle air-conditioner control system that can reduce disagreeableness of air-conditioning wind and compressor noise to thereby enable a passenger to board a vehicle comfortably, and that can avoid stopping an air-conditioner before the air-conditioner is activated again to be capable of sufficient air conditioning even in a strict environment by detecting that the passenger is proximate to the vehicle before the passenger is onboard and controlling the air-conditioner in a silent mode.

To solve the above problems, according to a first technical aspect of the present invention, a vehicle air-conditioner control system for controlling a temperature of a compartment of a vehicle, comprising: an air conditioner configured to adjust the temperature of the compartment; a heat-load detector detecting a heat load imposed on the vehicle; an air-conditioner remote controller configured to remotely control the air conditioner according to a passenger of the vehicle; a passenger-proximity determiner configured to determine whether the passenger is proximate to the vehicle; and an air-conditioner controller configured to control the air conditioner based on the heat load if the air-conditioner remote controller activates the air conditioner before the passenger is onboard, and to control the air conditioner to be set in a silent mode if the passenger-proximity determiner determines that the passenger is proximate to the vehicle.

According to a second technical aspect of the present invention, the vehicle air-conditioner control system further comprises a power-supply switch configured to open or close a connection to a member that supplies a high voltage in a power supply of the vehicle, wherein if the passenger-proximity determiner determines that the passenger is proximate to the vehicle, the power-supply switch shuts off the connection to the power supply.

According to a third technical aspect of the present invention, in addition to the first technical aspect, the vehicle air-conditioner control system further comprises: a power-supply switch for the air conditioner configured to open or close a connection between a power supply of the vehicle and the air conditioner; and a driving power-supply switch configured to open or close a connection between the power supply of the vehicle and a driving system of the vehicle, wherein if the air-conditioner remote controller activates the air conditioner, only the power-supply switch for the air conditioner is connected.

According to a fourth technical aspect of the present invention, in addition to the first technical aspect, the vehicle air-conditioner control system further comprises: a vehicle-position measuring unit configured to detect a position of the vehicle; and a passenger-position measuring unit configured to detect a position of the passenger, wherein the air-conditioner controller calculates a distance between the vehicle and the passenger based on detection results of the vehicle-position measuring unit and the passenger-position measuring unit, and controls the air conditioner based on the calculated distance between the vehicle and the passenger and the heat load detected by the heat-load detector.

BEST MODES FOR CARRYING OUT THE INVENTION

Embodiments of a vehicle air-conditioner control system according to the present invention will be explained below in detail with reference to the drawings.

First Embodiment

Figure 1:
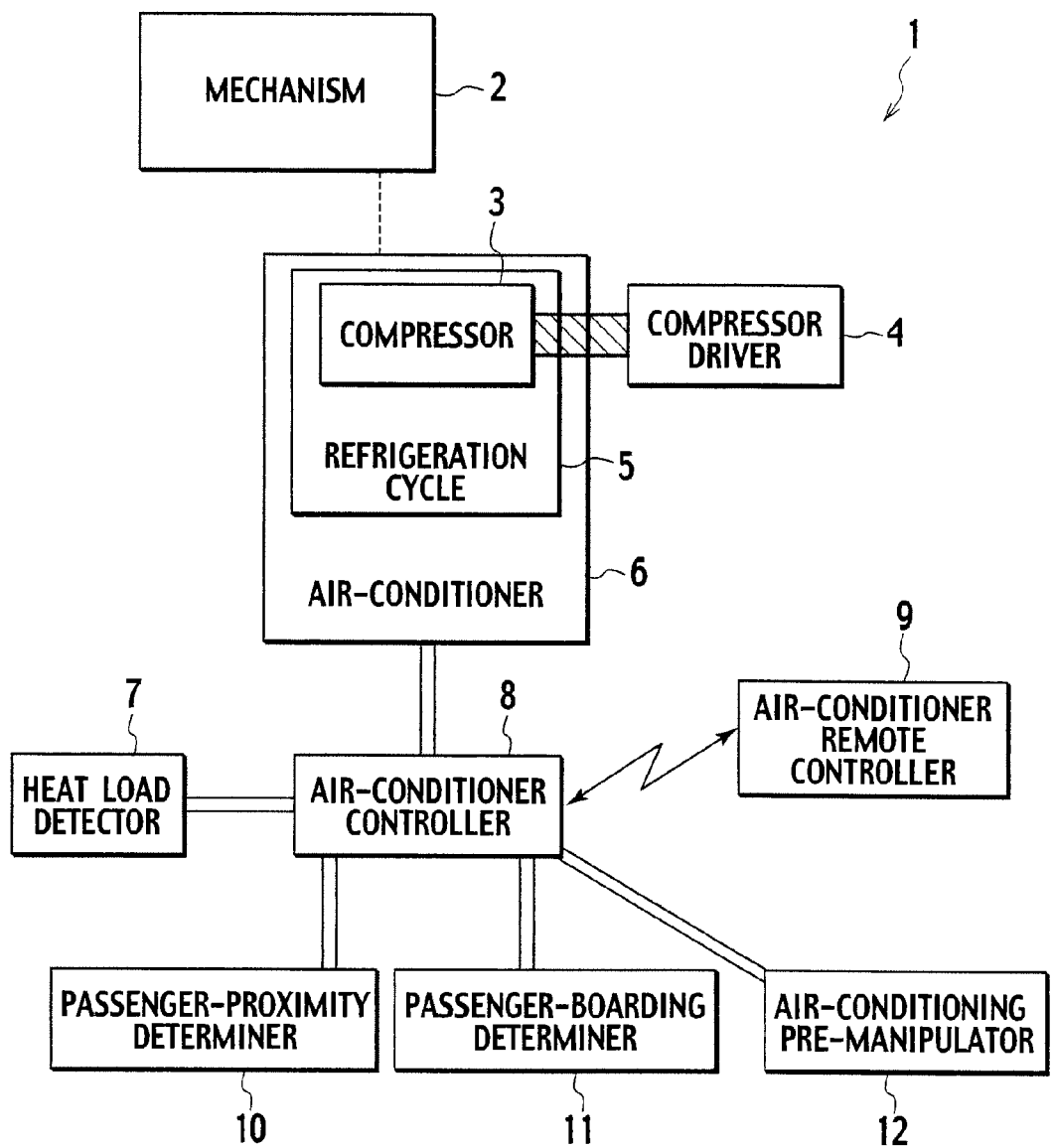
FIG. 1 is a block diagram showing a configuration of a vehicle air-conditioner control system according to a first embodiment of the present invention.

FIG. 1 is a block diagram showing a configuration of a vehicle air-conditioner control system according to a first embodiment.

As shown in FIG. 1, a vehicle air-conditioner control system 1 according to the present embodiment includes a mechanism 2 (hereinafter, "engine 2" where appropriate) such as a motor or an engine that generates a driving force of a vehicle 40, a compressor 3 that pressurizes and compresses a refrigerant of a refrigeration cycle, a compressor driver 4 driving the compressor 3, a refrigeration cycle 5 including the compressor 3, a refrigeration cycle unit, a heat exchanger, a piping and the like, an air conditioner (air-conditioning unit) 6 that includes the refrigeration cycle 5 and that supplies an air-conditioning wind into a vehicle compartment, a heat load detector (heat load detecting unit) 7 configured to detect heat load imposed on the compartment (e.g., solar radiation, outdoor air temperature, and compartment temperature), an air-conditioner controller (air-conditioner control unit) 8 configured to control the air-conditioner 6 based on an output of the heat load detector 7 and an air-conditioner set value set by a passenger, an air-conditioner remote controller (air-conditioner remote control unit) 9 configured to operate air-conditioning of the vehicle by remote control, a passenger-proximity determiner (passenger-proximity determining unit) 10 configured to determine whether the passenger is proximate to the vehicle, a passenger-boarding determiner (passenger-boarding determining unit) 11 configured to determine whether the passenger is onboard, and an air-conditioner pre-manipulator (air-conditioner pre-manipulating unit) 12 configured to activate the air-conditioner 6 when it is a predetermined time set by the passenger or the predetermined time passes.

Figure 2:
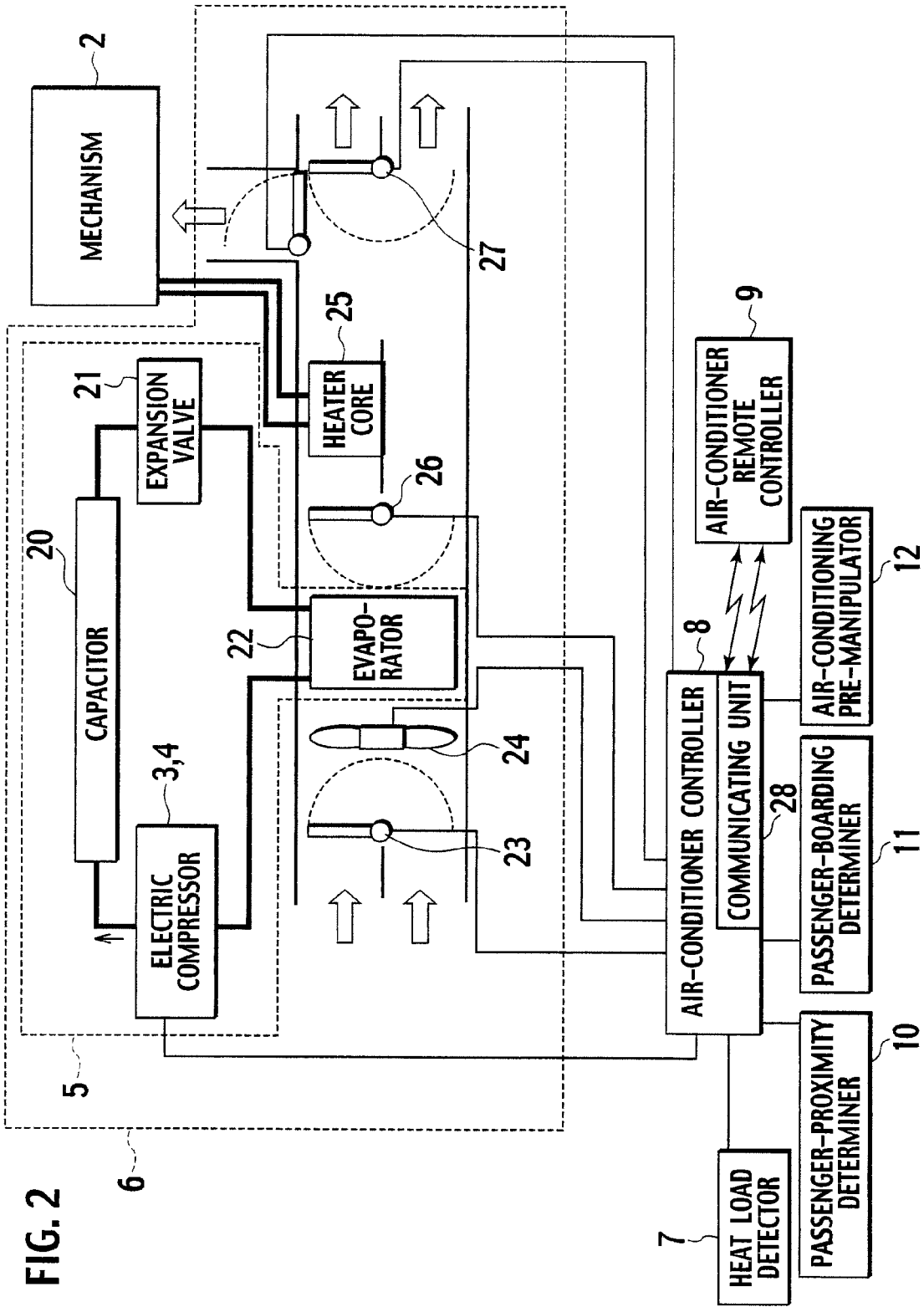
FIG. 2 is an explanatory diagram of a detailed configuration of an air conditioner in the vehicle air-conditioner control system.

A detailed configuration of the air-conditioner 6 will be explained with reference to FIG. 2. As the compressor 3, a so-called closed electric compressor, for example, integral with the compressor driver 4 such as an electric motor can be employed. As shown in FIG. 2, the compressor 3 and the compressor driver 4 are accommodated in one housing.

The refrigeration cycle 5 includes the compressors 3 and 4, a capacitor 20, an expansion valve 21, an evaporator 22, and the like and is a cycle including a piping for supplying a coolant to these components.

The air-conditioner 6 having the refrigeration cycle 5 includes an indoor-outdoor air changeover door 23 that changes over from indoor air to outdoor air and that introduces the outdoor air into the compartment, a blower fan 24 that generates the air-conditioning wind, a heater core 25 that is a heat exchanger for a heating source for mainly heating the compartment using cooling-water heat, an air mix door 26 that adjusts a passing distribution ratio of the air-conditioning wind for distributing the air-conditioning wind to the heater core 25, and a blowing-port selecting door 27 that selectively supplies the air-conditioning wind to one of a defroster blowing port, a ventilator blowing port, and a foot blowing port.

The air-conditioner controller 8 acquires data from the heat load detector 7 that measures the outdoor air temperature, the compartment temperature, the solar radiation, and the like. When the passenger operates an air-conditioner setting unit (not shown), set data such as an air flow, a target compartment temperature, indoor-outdoor air changeover/selection is inputted to the air-conditioner controller 8. The air-conditioner controller 8 performs a predetermined arithmetic operation and controls operations performed by the compressor 3, the compressor driver 4, the indoor-outdoor air changeover door 23, the blower fan 24, the air mix door 26, the blowing-port selection door 27 and the like. A communicating unit 28 is incorporated in the air-conditioner controller 8, and the communicating unit 28 receives a radio signal from the air-conditioner remote controller 9 provided outside the vehicle to use air-conditioning control. Furthermore, the air-conditioner controller 8 is configured to receive signals from the passenger-proximity determiner 10 and the passenger-boarding determiner 11 so that information as to whether a passenger is proximate to the vehicle or a passenger is onboard is used for air-conditioning control.

The passenger-proximity determiner 10 determines whether the passenger is proximate to the vehicle, and determines that the passenger is proximate to the vehicle particularly as the passenger opens a vehicle door, the vehicle door is unlocked or it is determined by communication with a remote controller held by the passenger that the passenger is proximate. It is thereby possible to ensure detecting that the passenger is proximate to the vehicle and executing air-conditioning control.

The air-conditioning pre-manipulator 12 activates the air-conditioner 6 and executes air conditioning so as to set the compartment into a preset air-conditioned state when it is the predetermined time set by the passenger or the predetermined time set by the passenger passes. It is thereby possible to activate the air-conditioner 6 at a passenger-desired time and complete air conditioning with minimum energy before the passenger is onboard.

Figure 3:
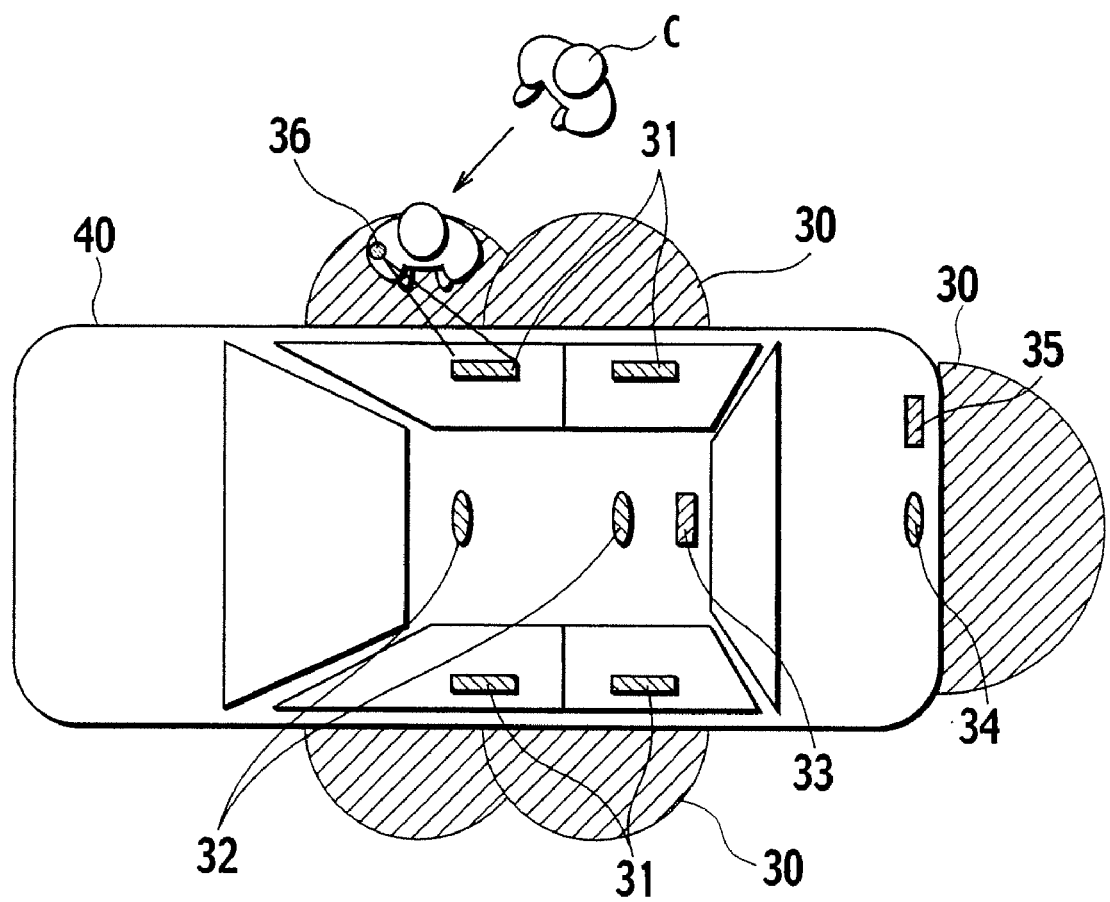
FIG. 3 is an explanatory diagram of a communication between an air-conditioner remote controller and a vehicle.

The communication between the air-conditioner remote controller 9 and the vehicle will be explained with reference to FIG. 3. As shown in FIG. 3, the vehicle air-conditioner control system 1 according to the present embodiment includes an external transmitter 31, a compartment transmitter 32, a compartment receiver 33, a trunk transmitter 34, and a trunk receiver 35.

When a passenger C carrying a remote controller 36 enters a detection area 30 as shown in FIG. 3, the control system 1 detects the proximity of the passenger C to the vehicle according to a radio wave transmitted from the remote controller 36 in which the air-conditioner remote controller 9 is disposed.

The external transmitter 31 includes an antenna and a touch sensor, and constantly transmits a radio wave to the passenger C who carries the remote controller 36. Upon reception of the radio wave, the remote controller 36 transmits a radio wave to the compartment receiver 33 accordingly. Likewise, upon reception of a radio wave from the trunk transmitter 34, the remote controller 36 transmits a radio wave to the trunk receiver 35 accordingly. If the compartment receiver 33 receives the radio wave from the remote controller 36 and recognizes a specific identification number superimposed on the radio wave, and the specific identification number of the vehicle coincides with that of the remote controller 36, then it is determined that the passenger C is proximate to the vehicle and the locked door is unlocked. Moreover, if the trunk receiver 35 receives the radio wave from the remote controller 36 and determines the identification number similarly to the compartment driver 33, and it is determined that the passenger C is proximate to a trunk, the trunk is unlocked. If the remote controller 36 cannot receive the radio waves from the respective transmitters 31 and 34, the remote controller 36 does not transmit radio waves to the respective receivers 33 and 35. The respective receivers 33 and 35 are, therefore, kept in present states.

Likewise, the compartment transmitter 32 constantly transmits a radio wave to the passenger C who carries the remote controller 36. Upon reception of the radio wave from the compartment transmitter 32, the remote controller 36 transmits a radio wave to the compartment receiver 33. The radio wave transmitted this time is a radio wave including a communication content different from that included in the radio wave transmitted from the external transmitter 31. The compartment receiver 33 can, therefore, determine whether the passenger C is outside the vehicle or inside the vehicle. It is thereby possible to perform air-conditioning control according to a position of the passenger C.

Alternatively, the air-conditioner remote controller 9 can be installed not in the vehicle remote controller but in an apparatus, e.g., a cellular phone or a personal computer that can transmit and receive signals through the Internet. This can facilitate applying existing technique to the vehicle air-conditioner control system 1, thereby making it possible to realize cost reduction.

<Air-Conditioning Process>

Figure 4:
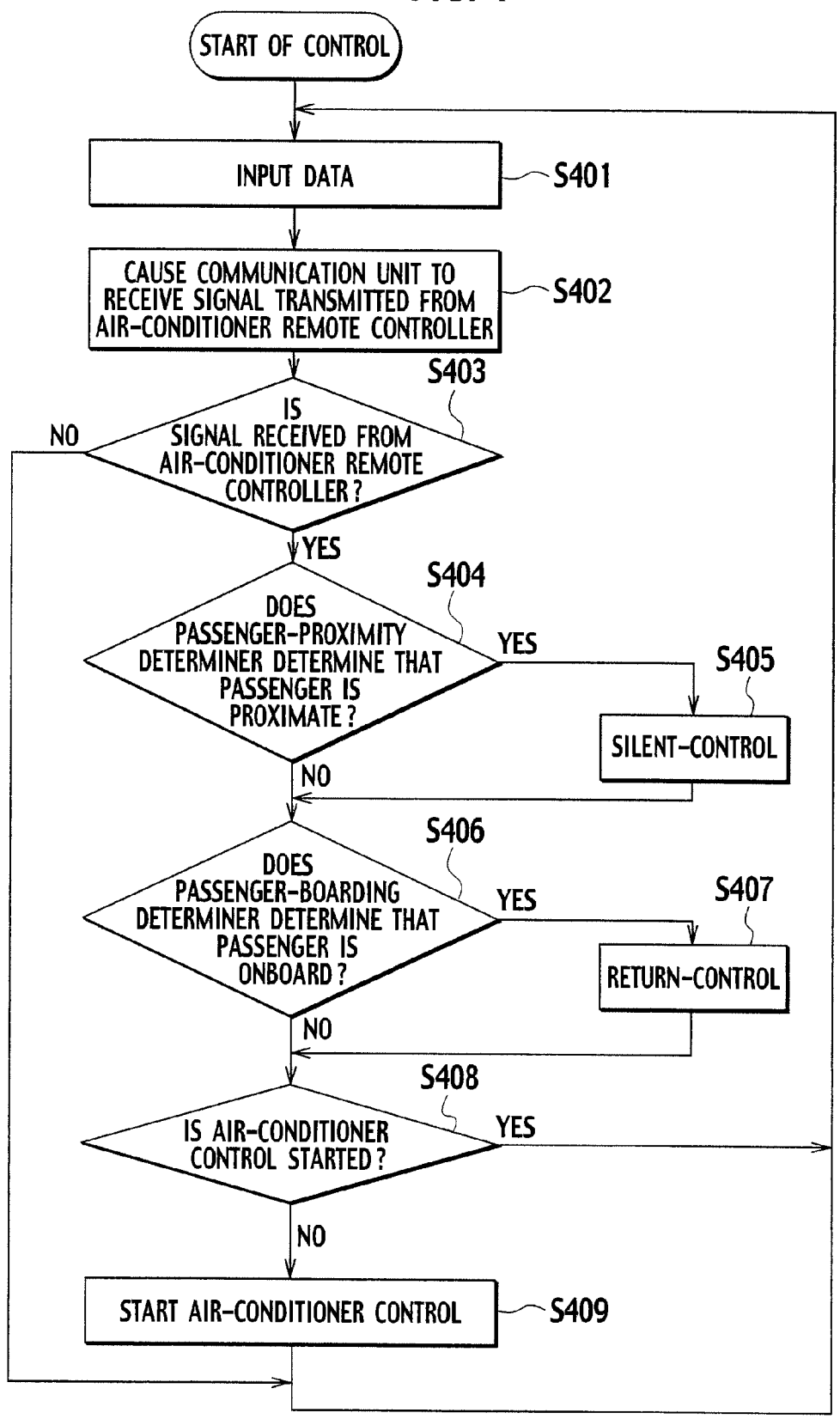
FIG. 4 is a flowchart showing an air-conditioner control process performed by the vehicle air-conditioner control system according to the first embodiment.

An air-conditioner control process performed by the vehicle air-conditioner control system 1 according to the present embodiment will be explained next with reference to the flowchart of FIG. 4.

When the air-conditioning process starts, data necessary for control is inputted to the air-conditioner controller 8 (S401) and the communicating unit 28 tries to receive the radio wave from the air-conditioner remote controller 9 (S402).

The air-conditioner controller 8 determines whether the radio wave from the air-conditioner remote controller 9 can be received (S403). If the radio wave cannot be received, the process returns to step S401, and if the radio wave can be received, the passenger-proximity determiner 10 determines whether the passenger is proximate (S404).

If it is determined that the passenger is proximate, then the air-conditioner controller 8 controls the air-conditioner 6 to be set in a silent mode (S405), and reduces noises and flow rates of the compressor 3 and the blower fan 24 before the passenger is onboard to lessen passenger's discomfort at the time of boarding. If it is determined that the passenger is not proximate, the air-conditioner controller 8 does not control the air-conditioner 8 to be set in the silent mode.

The passenger-boarding determiner 11 determines whether the passenger is onboard (S406). If the passenger-boarding determiner 11 detects an ON-state of an ignition key with which the passenger starts and stops the vehicle and determines that the passenger is onboard. And, if the passenger-boarding determiner 11 detects an OFF-state of the ignition key and determines that the passenger is not onboard. If it is determined by a passenger-seating sensor provided on a seat on which the passenger sits down that the passenger is seated for a predetermined time or longer, the passenger-boarding determiner can determine that the passenger is onboard. Alternatively, the above compartment transmitter 32, the remote controller 36, and the external receiver 33 can detect and determine that the passenger is onboard.

The air-conditioner controller 8 controls the air-conditioner 6 to be set in a return mode if it is determined that the passenger is onboard (S407) so as to control the air-conditioner 6 to be able to promptly return to the air-conditioning state set by the passenger. On the other hand, if it is determined that the passenger is not onboard, the air-conditioner controller 8 does not control the air-conditioner 6 to be set in the return mode.

It is then determined that the air conditioning in the silent mode or the return mode has already started (S408). If the air conditioning is already started, then the process returns to step S401 to repeatedly perform the above process. If the air conditioning is not started, then the air-conditioner control is started (S409), the process returns to step S401 to repeatedly perform the above process, and the vehicle is air-conditioned.

In this manner, in the vehicle air-conditioner control system 1 according to the present embodiment, the air-conditioner remote controller 9 activates the air-conditioner 6 before the passenger is onboard, and controls the air-conditioner 6 to be set in the silent mode if it is detected that the passenger is proximate. It is, therefore, possible to lessen the discomfort caused by the air-conditioning wind and the noise of the compressor and to make the passenger to feel comfortable onboard.

<Silent Mode Operation>

Figure 5:
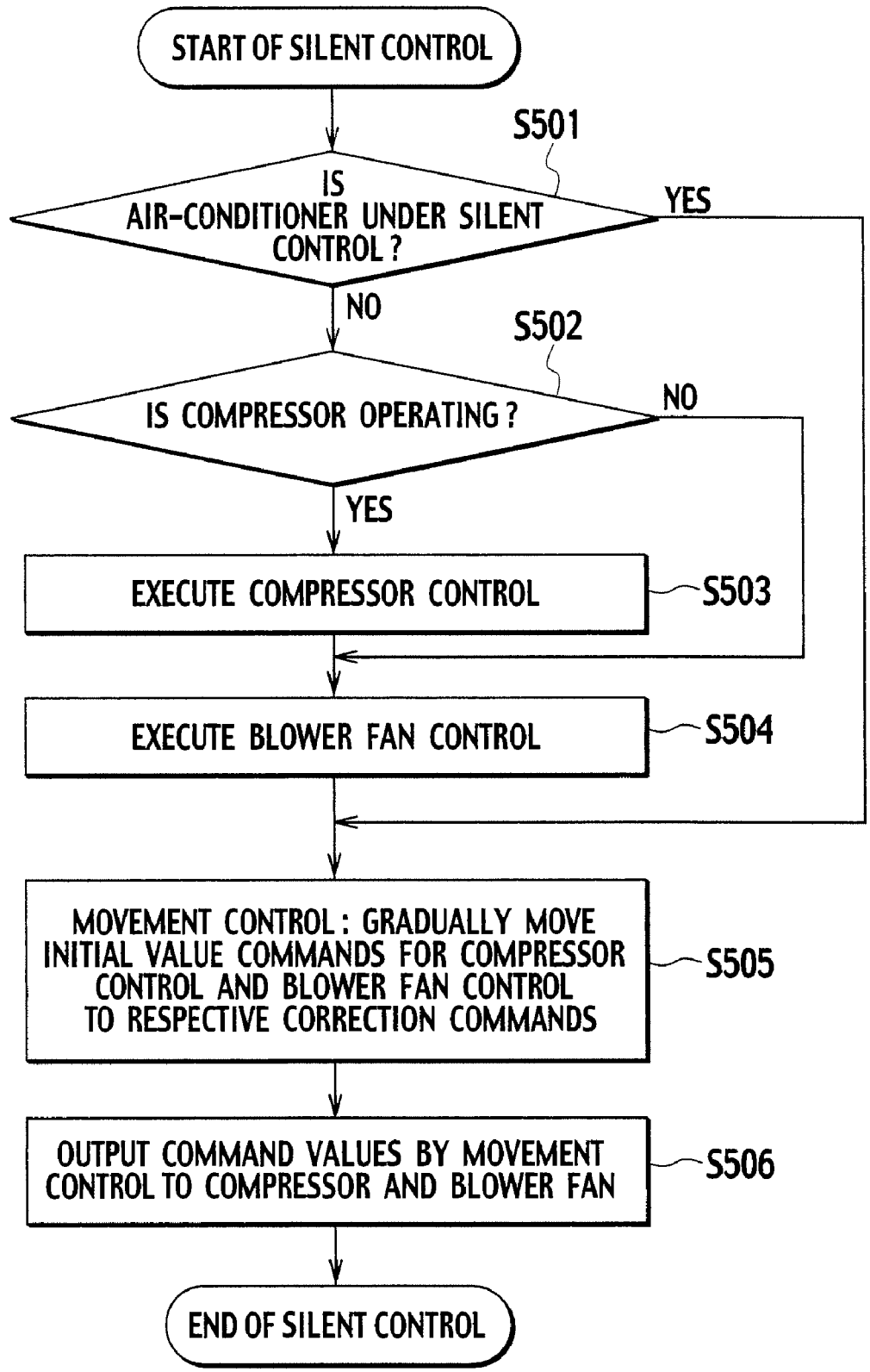
FIG. 5 is a flowchart showing the air-conditioner control process in a silent mode performed by the vehicle air-conditioner control system according to the first embodiment.

The air-conditioner control in the silent mode at step S405 stated above will be explained next with reference to the flowchart of FIG. 5.

When the air-conditioning control in the silent mode starts, the air-conditioner controller 8 determines whether the air-conditioner 6 is under silent control (S501). If the air-conditioner 6 is not under silent control, the air-conditioner controller 8 further determines whether the compressor 3 is operating (S502). If the compressor 3 is operating, the air-conditioner controller 8 executes compressor control (S503). In this compressor control, the air-conditioner controller 8 controls the number of revolutions of the compressor so as to stop the compressor or to set the compressor to have the small number of revolutions.

Figure 6:
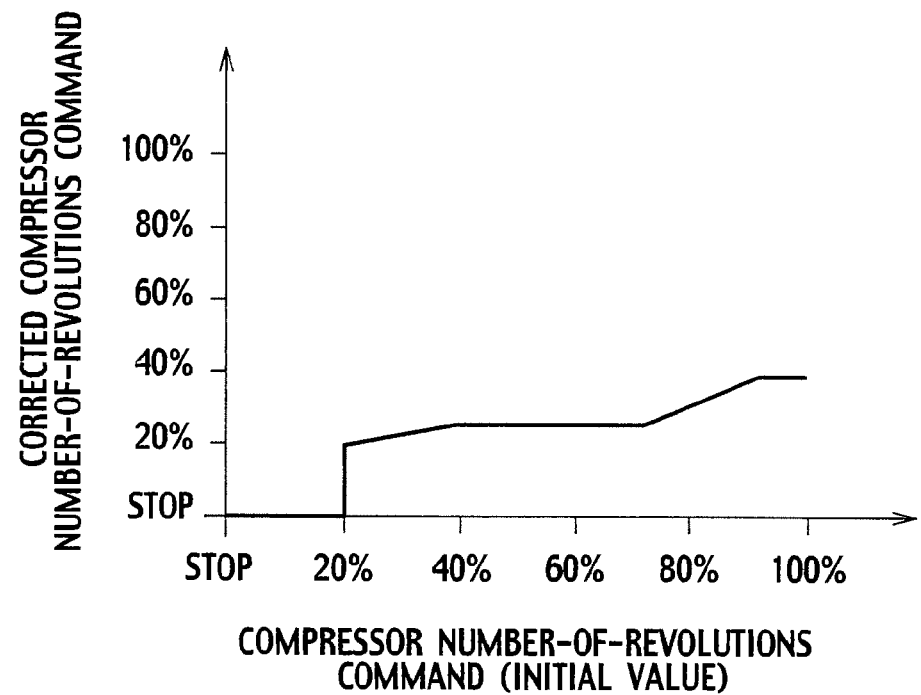
FIG. 6 is an explanatory diagram of compressor control in the silent mode.

The compressor control at step S503 will be explained with reference to FIG. 6. As shown in FIG. 6, in this compressor control, the air-conditioner controller 8 outputs a corrected number of revolutions of the compressor command on an ordinate axis to correspond to a command of a number of compressor revolutions (initial value) on an abscissa axis. A unit is a rate (percent) relative to a maximum number of revolutions of the compressor.

In the present embodiment, therefore, if the command of a number of compressor revolutions (initial value) is equal to or smaller than 20%, the air-conditioner controller 8 controls the compressor to be inoperative, and if the command of a number of compressor revolutions (initial value) is equal to or smaller than 20% to 100%, the air-conditioner controller 8 controls the operation of the compressor to reduce the number of revolutions to 20% to 40%. As obvious to those skilled in the art, a control diagram is not limited to that shown in FIG. 6, but can be changed to an optimum control diagram according to the heat load, a magnitude of the compartment or the like to execute the compressor control.

In this way, if the compressor control is executed at step S503 or it is determined at step S502 that the compressor is not operating, the air-conditioner controller 8 then executes blower fan control (S504). In this blower fan control, the air-conditioner controller 8 controls an applied voltage so that the number of revolutions of the blower fan changes smaller.

Figure 7:
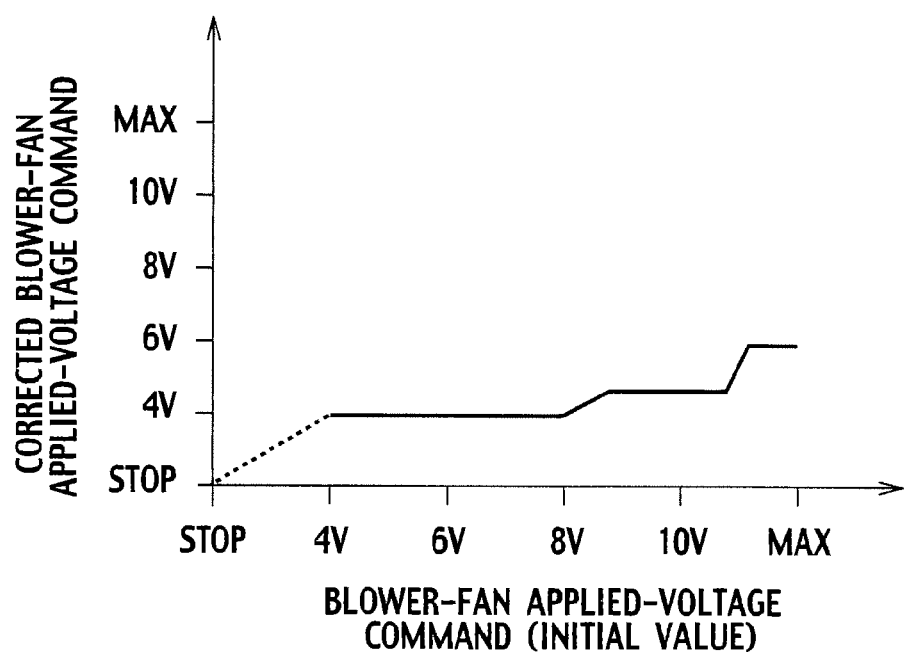
FIG. 7 is an explanatory diagram of blower fan control in the silent mode.

The blower fan control at step S504 will be explained with reference to FIG. 7. As shown in FIG. 7, in this blower fan control, a predetermined corrected applied-voltage command of a blower-fan (on a vertical axis) is outputted to correspond to an applied-voltage command of a blower-fan (initial value) indicated on an abscissa axis. The unit of the axes is a voltage (in volts) applied to the blower fan. Accordingly, if the applied-voltage command of a blower-fan (initial value) in a range of four to MAX (V) is inputted, the operation of the blower fan is controlled to reduce the voltage to the applied-voltage command of a blower-fan in a range of four to six (V). The control diagram is not limited to that shown in FIG. 7, but can be changed to an optimum control diagram according to the heat load, the magnitude of the compartment or the like to execute the blower fan control.

In this manner, if the blower fan control is executed at step S504 or if it is determined at step S501 that the air-conditioner is already under silent control, the air-conditioner controller 8 then executes a transition control to temporally gradually change the number of revolutions of the compressor and the voltage applied to the blower-fan given as initial values to the respective corrected values outputted in the above compressor control and blower fan control (S505). In this transition control, a transition time can be adjusted according to a distance between the passenger and the vehicle, an estimated time required until the passenger boards the vehicle, or the like.

If the outputs of the compressor and the blower fan are thus changed to the respective corrected values (S506), the vehicle air-conditioner control system 1 according to the present embodiment finishes the air conditioning in the silent mode.

In this manner, the vehicle air-conditioner control system 1 according to the present embodiment stops or reduces the air-conditioning wind in the silent mode. It is, therefore, possible to lessen the discomfort caused by the air-conditioning wind at the time of passenger boarding and make the passenger feel comfortable onboard. Moreover, since the number of revolutions of the compressor 3 is stopped or reduced in the silent mode, the noise of the compressor 3 at the time of passenger boarding can be lessened and the passenger can be made to feel comfortable onboard.

<Return Mode Operation>

Figure 8:
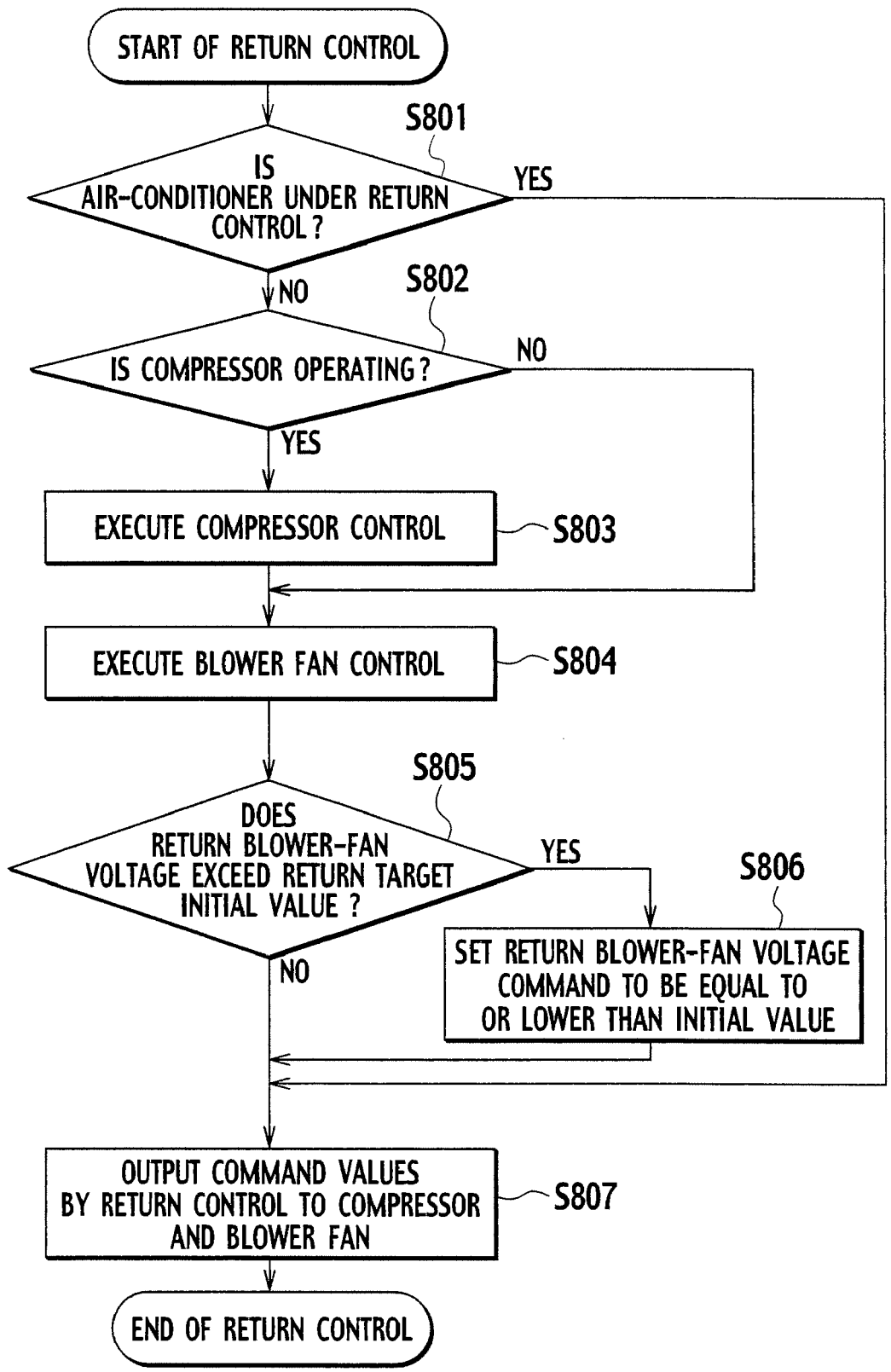
FIG. 8 is a flowchart showing the air-conditioner control process in a return mode performed by the vehicle air-conditioner control system according to the first embodiment.

The air-conditioner control in the return mode at step S407 stated above will be explained with reference to the flowchart of FIG. 8. When the air-conditioning control in the return mode starts, the air-conditioner controller 8 determines whether the air-conditioner 6 is under return control (S801). If the air-conditioner 6 is not under return control, the air-conditioner controller 8 determines whether the compressor 3 is stopped (S802). If the compressor 3 is not stopped, the air-conditioner controller 8 executes compressor control (S803). In this compressor control, the air-conditioner controller 8 determines a return rate for a target number of compressor revolutions based on a return time and degree of heat load. It is noted that the return time is a time since it is determined that the passenger is onboard, for example, an ignition switch is turned on.

Figure 9:
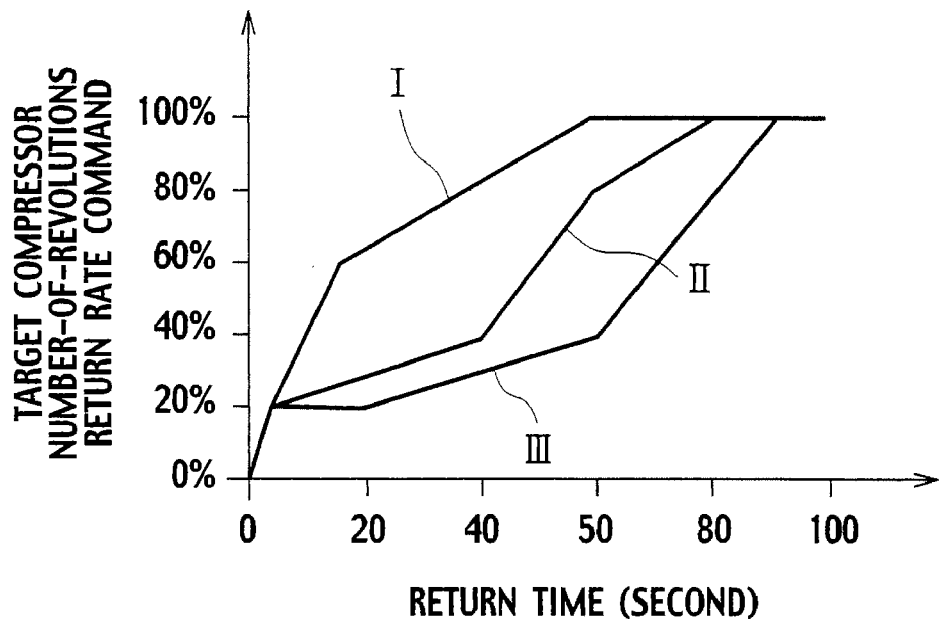
FIG. 9 is an explanatory diagram of compressor control in the return mode.

The compressor control at step S803 will be explained with reference to FIG. 9. As shown in FIG. 9, in the compressor control according to the present embodiment, control diagrams in a case (I) where the heat load is heavy, a case (II) where the heat load is medium, and a case (III) where the heat load is light are prepared, and one of the control diagrams is selected based on a detection result of the heat load detector 7, and the return rate for the target number of compressor revolutions is outputted according to the return time.

For example, if the return time is 20 seconds under condition of the high heat load, the return rate for the target number of compressor revolutions is set to 60% based on the diagram II shown in FIG. 9. As a result, if an initial value of the compressor number-of-revolutions command is 50% and a corrected compressor number-of-revolutions command is 28%, the return rate for the target number of compressor revolutions is set to 28%+(50%−28%)×60%=41.2% to return from 28% to 50%. If the heat load is lower, the return rate is set lower to return more slowly so that the passenger finds it more difficult to recognize the noise of the compressor. Under condition of higher heat load, the return rate is higher, so that necessary cooling capability can be obtained in short time and air-conditioning comfort can be improved. The control diagrams are not limited to those shown in FIG. 9, but can be changed to optimum control diagrams according to the heat load, the magnitude of the compartment or the like to execute the compressor control.

In this way, if the compressor control is executed at step S803 or it is determined at step S802 that the compressor is stopped, the air-conditioner controller 8 then executes blower fan control (S804). In this blower fan control, the air-conditioner controller 8 determines a return blower-fan applied voltage according to the return time.

Figure 10:
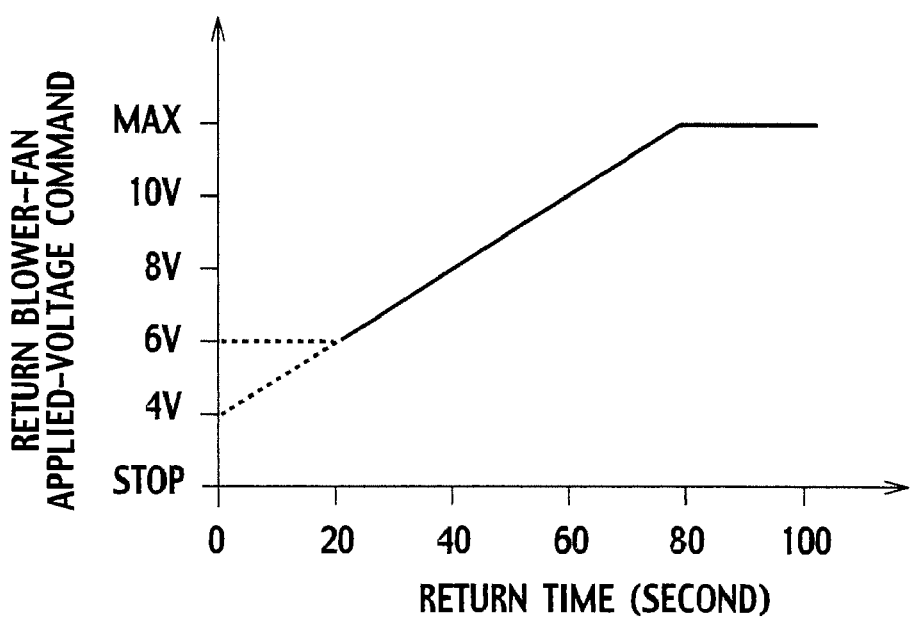
FIG. 10 is an explanatory diagram of blower fan control in the return mode.

The blower fan control at step S804 will be explained with reference to FIG. 10. As shown in FIG. 10, a blower-fan applied-voltage command is gradually raised according to the return time to gradually return the blower fan, so that a sense of discomfort about the noise of the blower fan is lessened. The return time in a range from 0 to 20 seconds depicted by a dotted line corresponds to the fact that the corrected applied-voltage command of a blower-fan shown in FIG. 7 is somewhere between 4 and 6 V. Since this corrected applied-voltage command of a blower-fan is set as the initial value, the command is depicted by the dotted line. The control diagram is not limited to that shown in FIG. 10, but can be changed to an optimum control diagram according to the heat load, the magnitude of the compartment or the like to execute the blower fan control.

In this manner, if the blower fan control is executed, it is then determined whether the return blower fan voltage exceeds the return target initial value (S805). If the return blower fan voltage exceeds the return target initial value, the return blower fan voltage command is set to be equal to or lower than the initial value (S806).

If the return blower fan command is set to be equal to or lower than the initial value or it is determined at step S801 that the air-conditioner is already under return control, the air-conditioner controller 8 outputs command values by the return control to the compressor and the blower fan (S807), whereby the vehicle air-conditioner control system 1 according to the present embodiment finishes the air-conditioner control in the return mode.

As explained above, in the vehicle air-conditioner control system 1 according to the present embodiment, if the passenger-boarding determiner 11 determines that the passenger is onboard, the air-conditioner 6 is controlled to be set in the return mode for returning from the silent mode to the air-conditioned state preset by the passenger. It is, therefore, possible to promptly change to the passenger-desired air-conditioned state and thereby improve air-conditioning comfort of the passenger.

In other words, the vehicle air-conditioner control system according to the present invention exhibits the following advantages.

(1) The air-conditioner remote controller activates the air-conditioner before the passenger is onboard, and the air-conditioner is controlled to be set in the silent mode if the passenger-proximity determiner determines that the passenger is proximate to the vehicle. Therefore, it can lessen the discomfort caused by the air-conditioning wind and the noise of the compressor at the time of passenger boarding and to make the passenger feel comfortable onboard.

(2) It is determined that the passenger is proximate to the vehicle in one of the case where the passenger opens the door of the vehicle, the case where the door is unlocked, and the case where it is determined by the communication with the remote controller carried by the passenger that the passenger is proximate. It is, therefore, possible to ensure detecting that the passenger is proximate to the vehicle.

(3) In the silent mode, the air-conditioning wind is stopped or reduced. It is, therefore, possible to lessen the discomfort caused by the air-conditioning wind at the time of passenger boarding and to make the passenger feel comfortable onboard. Since the number of revolutions of the compressor that is included in the air-conditioner is zeroed or reduced, it is possible to lessen the noise of the compressor at the time of passenger boarding to make the passenger feel comfortable onboard.

(4) The air-conditioner remote controller is disposed in one of the cellular phone, the vehicle remote controller, and the apparatus that can transmit and receive signals over the Internet. This can facilitate applying existing technique to the vehicle air-conditioner control system 1, thereby making it possible to realize cost reduction.

(5) The vehicle air-conditioner control system 1 according to the embodiment further includes the air-conditioner pre-manipulator unit that activates the air-conditioner when it is a predetermined time set by the passenger or the predetermined time set by the passenger passes. It is, therefore, possible to activate the air-conditioner at a passenger-desired time and complete air conditioning with minimum energy before the passenger is onboard.

(6) If the passenger-boarding determiner determines that the passenger is onboard, the air-conditioner is controlled to be set in the return mode from the silent mode to the air-conditioned state preset by the passenger. It is, therefore, possible to promptly change the state to the passenger-desired air-conditioned state and thereby improve air-conditioning comfort of the passenger.

Second Embodiment

Figure 11:
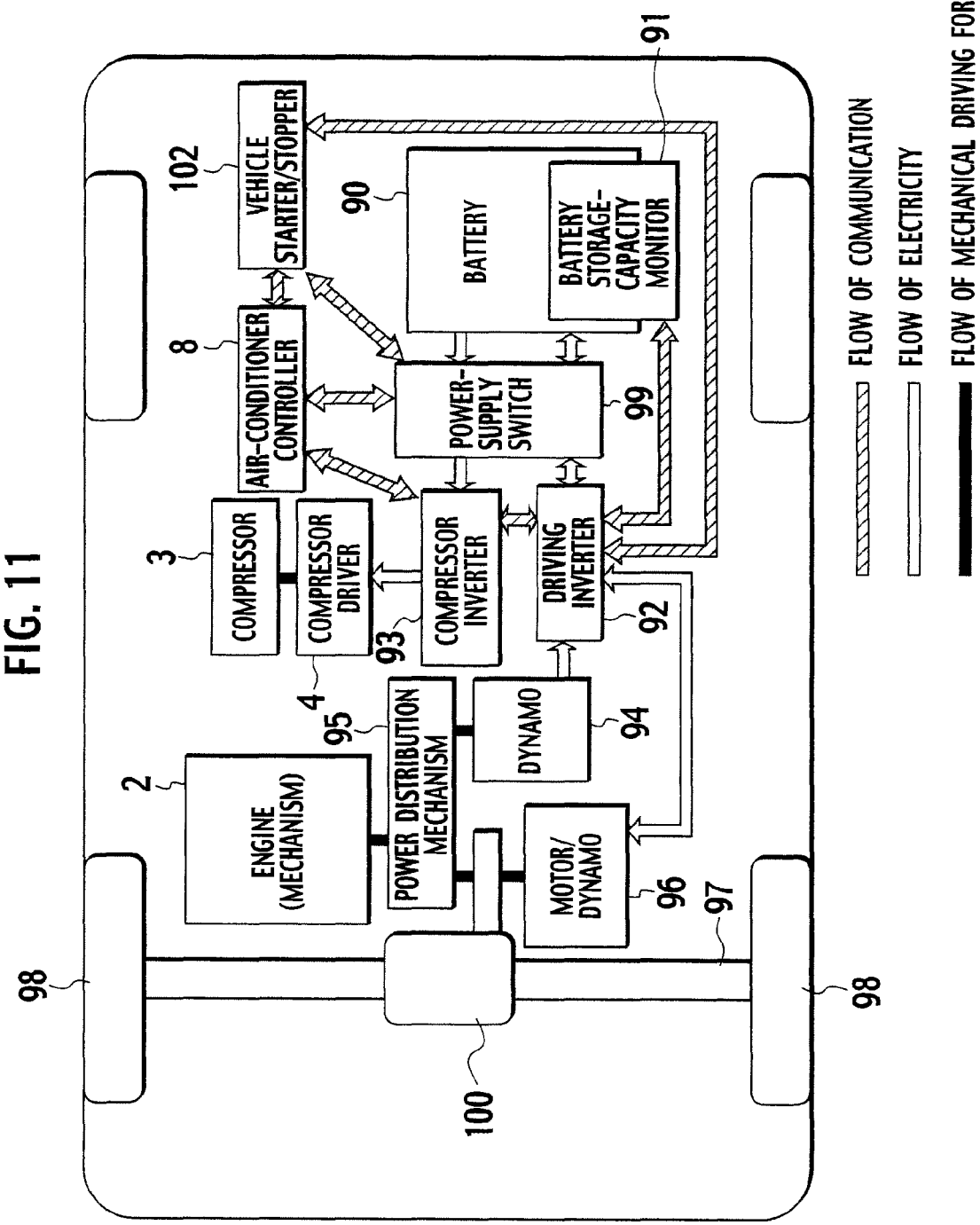
FIG. 11 is a block diagram showing a configuration of a vehicle in which a vehicle air-conditioner control system according to a second embodiment is mounted.

A second embodiment of the present invention will be explained with reference to the drawings. FIG. 11 is a block diagram showing a configuration of a vehicle in which a vehicle air-conditioner control system according to the present embodiment is mounted.

As shown in FIG. 11, the vehicle in which the vehicle air-conditioner control system according to the present embodiment is mounted uses a battery 90 as a power supply, and a battery storage-capacity monitor 91 monitors a storage capacity of the battery. A current from the battery 90 is supplied, via a power-supply switch (power-supply switching unit) 99, to a driving inverter 92 and a compressor inverter 93. The driving inverter 92 communicates with the battery storage-capacity monitor 91, controls current consumption according to the storage capacity of the battery 90 to regenerate vehicle driving energy, and adjusts the storage capacity of the battery 90.

The current supplied to the driving inverter 92 is supplied to a motor/dynamo 96 to drive driving wheels 98 via a power transmission/distribution mechanism 100 and a driving shaft 97.

If an engine 2 is active, the driving wheels 98 are driven by a driving force of the engine 2 via a power distribution mechanism 95, the power transmission/distribution mechanism 100, and the driving shaft 97. At the time of braking or decelerating the vehicle, a driving force of the driving wheels 98 is transmitted to a dynamo 94 via the driving shaft 97, the power transmission/distribution mechanism 100, and the power distribution mechanism 95, the driving force is converted from mechanical energy into electrical energy, and the electrical energy is accumulated in the battery 90 via the driving inverter 92 and the power-supply switch 99.

The electrical energy of the battery 90 is transmitted to the compressor inverter 93 via the power-supply switch 99, with which the compressor driver 4 such as an electric motor drives the compressor 3.

The power-supply switch 99 is controlled by a vehicle starter/stopper 102 that causes the passenger to start or stop the vehicle with an ignition key and an air-conditioner controller 8. Furthermore, the vehicle starter/stopper 102 communicates with the air-conditioner 8 and the driving inverter 92 and controls both of them. In other words, if the passenger starts the vehicle, then the power-supply switch 99 is connected, and the current from the battery 90 is supplied to the driving inverter 92 and the compressor inverter 93. If the passenger starts to work the air-conditioner 6 of the vehicle using the air-conditioner remote controller 9, then the power-supply switch 99 is connected by the air-conditioner controller 8, the current from the battery 90 is supplied to the driving inverter 92 and the compressor inverter 93, the compressor inverter 93 is controlled, and the air-conditioner 6 including the compressor 3 is controlled to be activated.

If the passenger stops the vehicle (not temporarily stops the vehicle but turns the vehicle into an unused state), then the air-conditioner controller 8 is controlled to appropriately stop the air-conditioner 6 and the driving inverter 92, and to open the power-supply switch 99 to shut off power. As a result, no current is supplied from the battery 90 in the vehicle under unused state, so that even if some component driven with the current malfunctions, it is advantageously possible to avoid troubles related to a power supply system.

Figure 12:
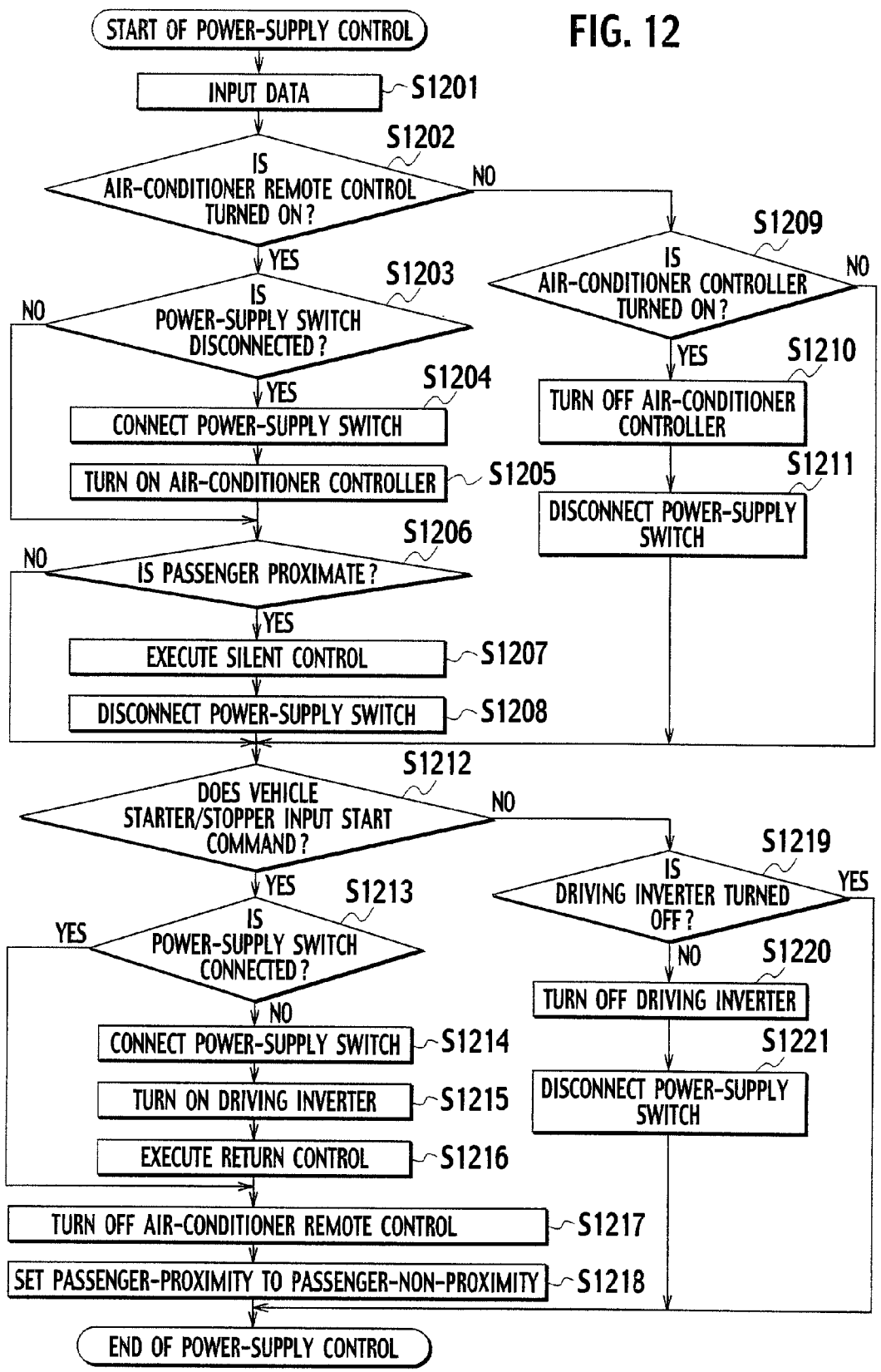
FIG. 12 is a flowchart showing a power-supply control process performed by the vehicle air-conditioner control system according to the second embodiment.

A power-supply control process performed by the vehicle air-conditioner control system according to the present embodiment will be explained with reference to the flowchart of FIG. 12. First, when power-supply control starts, status data or the like on the power-supply switch 99 used for the control is inputted (S1201), a command to activate the air-conditioner 6 is inputted from the air-conditioner remote controller 9, and the air-conditioner controller 8 determines whether to start air-conditioning (S1202). If the air-conditioning is to be started, it is determined whether the power-supply switch 99 is disconnected (S1203). If the power-supply switch 99 is disconnected, then the power-supply switch 99 is connected (turned on) (S1204), and the air-conditioner controller 8 is activated (S1205).

The passenger-proximity determiner 10 determines whether the passenger is proximate (S1206). If the vehicle is proximate, then the control in the silent mode shown in FIG. 5 is executed (S1207), and the power-supply switch 99 is opened (S1208). By doing so, if the passenger is proximate to the vehicle, the passenger can board the vehicle in a state where no high voltage is applied. The blower fan 24 for generating the air-conditioning wind is driven with a low-voltage power, i.e., a voltage of 12 to 14V even if the high voltage system is shut off. It is, therefore, possible to supply cool wind for about 20 to 60 seconds by the already-cooled evaporate 22.

If the command to activate the air-conditioner 6 is not inputted from the air-conditioner remote controller 9, it is determined whether the air-conditioner controller 8 is already activated (S1209). If the air-conditioner controller 8 is activated, then the air-conditioner controller 8 is inoperative (S1210), the power-supply switch 99 is opened, and the power from the battery 90 is shut off (S1211).

In this manner, if it is determined at step S1206 that the passenger is not proximate or the power-supply switch 99 is opened and shut off at steps S1208 and 1211, or if it is determined at step S1209 that the air-conditioner controller 8 is not activated, it is determined whether the start command is input from the vehicle starter/stopper 102 (S1212). If the start command is inputted, then the power-supply switch 99 is connected (turned on) (S1214), the driving inverter 92 is activated (S1215), and the return control shown in FIG. 8 is executed (S1216).

If the return control is executed at step S1216 or the power-supply switch 99 is connected at step S1213, then the start command to the air-conditioner 6, which the air-conditioner controller 8 receives from the air-conditioner remote controller 9 is changed to OFF (S1217), the passenger-proximity status is set to a status in which the passenger is not proximate (S1218), and the vehicle air-conditioner control system according to the present embodiment thereby finishes the power-supply control.

If the start command is not inputted from the vehicle starter/stopper 102 at step S1212, it is determined whether the driving inverter 92 is stopped (S1219). If the driving inverter 92 is stopped, the vehicle air-conditioner control system according to the present embodiment thereby finishes the power-supply control. If the driving inverter 92 is not stopped, then the driving inverter 92 is stopped (S1220), the power-supply switch 99 is opened (turned off) (S1221), and the vehicle air-conditioner control system according to the present embodiment thereby finishes the power-supply control.

As described above, the vehicle air-conditioner control system according to the present embodiment includes the power-supply switch 99 that opens or closes a connection to a member that supplies a high voltage in the vehicle power supply. If it is determined that the passenger is proximate to the vehicle, the power supply switch 99 is opened and turned off. Due to this, even if an insulation state of equipment that uses high voltage is insufficient, no high voltage is supplied at the time of passenger boarding, so that current leakage can be avoided.

Third Embodiment

Figure 13:
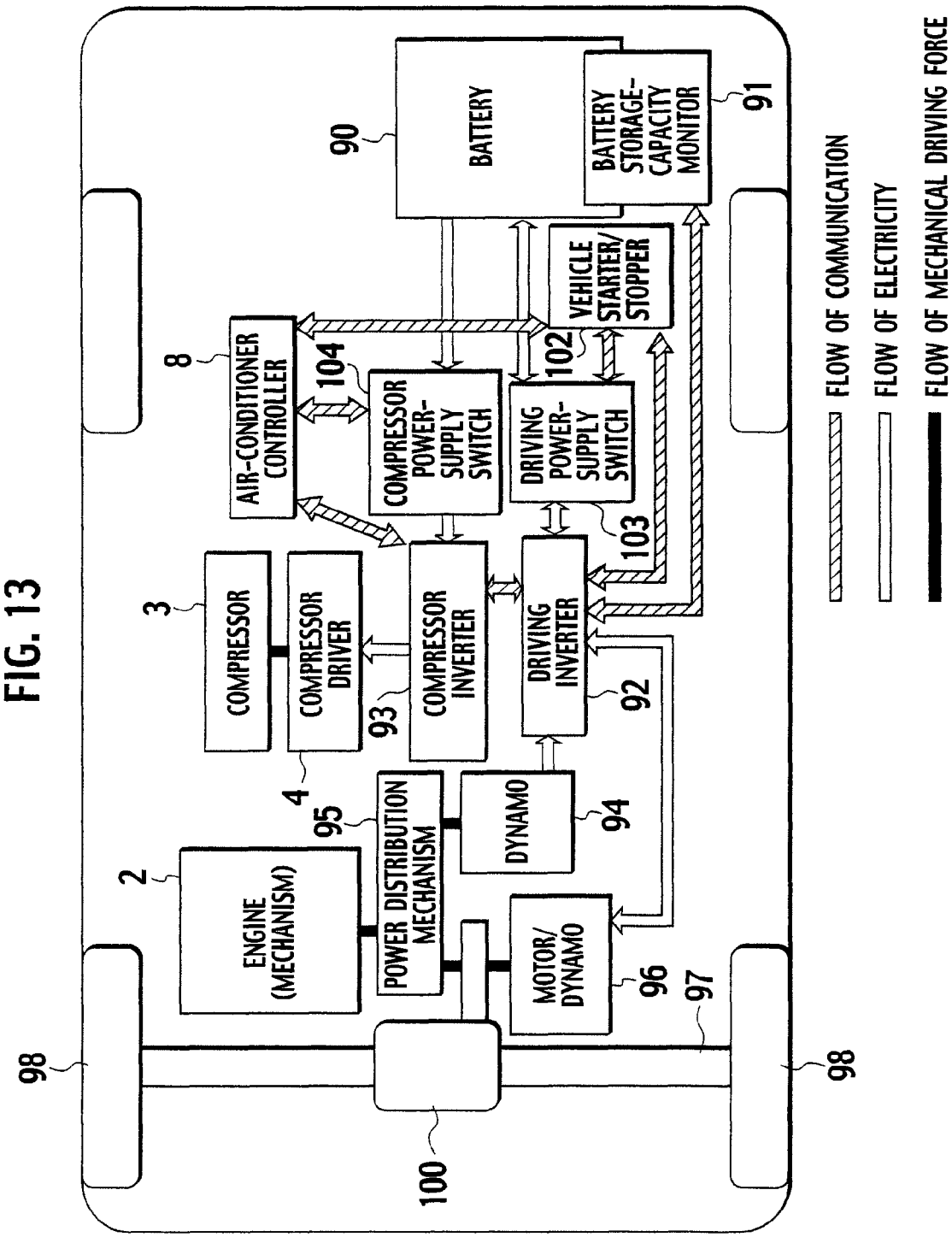
FIG. 13 is a block diagram showing a configuration of a vehicle in which a vehicle air-conditioner control system according to a third embodiment is mounted.

A third embodiment of the present invention will be explained with reference to the drawings. FIG. 13 is a block diagram showing a configuration of a vehicle in which a vehicle air-conditioner control system according to the present embodiment is mounted. As shown in FIG. 13, differently from the second embodiment, the vehicle mounting the vehicle air-conditioner control system according to the present embodiment includes a driving power-supply switch (driving power-supply switching unit) 103 that is provided between a battery 90 and a driving inverter 92, and a compressor power-supply switch (air-conditioner power-supply switching unit) 104 that is provided between the battery 90 and a compressor inverter 93. Since the other constituent elements of the vehicle in which the vehicle air-conditioner control system according to the present embodiment are identical with those according to the second embodiment, detailed explanations thereof will be omitted.

In the vehicle air-conditioner control system according to the present embodiment thus configured, the compressor power-supply switch 104 is controlled by an air-conditioner controller 8 and the driving power-supply switch 103 is controlled by a vehicle starter/stopper 102.

By modifying the configuration to the configuration described above, the power-supply switch can be separated into the driving power-supply switch and the compressor power-supply switch. Therefore, when the air-conditioner controller 8 activates an air-conditioner 6 including a compressor 3 in response to a command from an air-conditioner remote controller 9, there is no need to supply a current to the driving inverter 92. Accordingly, even if a component related to the driving system (with power consumption of about 50 kW) far higher in power consumption than the compressor with power consumption of about 5 kW malfunctions electrically, it is possible to set a state where no high current is supplied.

Figure 14:
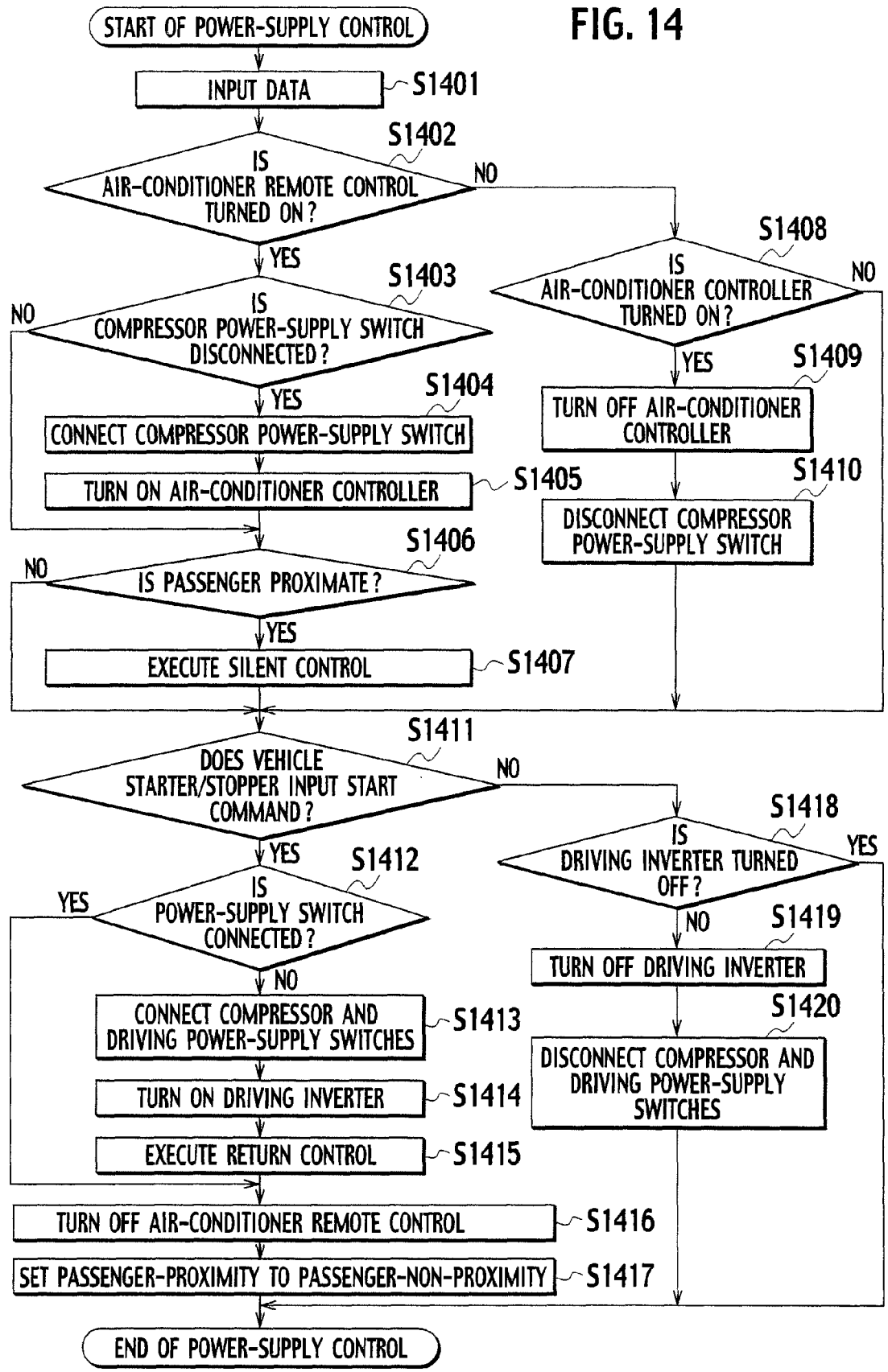
FIG. 14 is a flowchart showing a power-supply control process performed by the vehicle air-conditioner control system according to the third embodiment.

A power-supply control process performed by the vehicle air-conditioner control system according to the present embodiment will be explained with reference to the flowchart of FIG. 14.

First, when power-supply control starts, status data or the like on the driving power-supply switch 103 and the compressor power-supply switch 104 used for the control is input (S1401), a command to activate the air-conditioner 6 is inputted from the air-conditioner remote controller 9, and the air-conditioner controller 8 determines whether to start air-conditioning (S1402). If the air-conditioning is to be started, it is determined whether the compressor power-supply switch 104 is opened (turned off) (S1403). If the compressor power-supply switch 104 is turned off, then the compressor power-supply switch 104 is connected (turned on) (S1404), and the air-conditioner controller 8 is activated (S1405).

The passenger-proximity determiner 10 determines whether the passenger is proximate (S1406). If the vehicle is proximate, then the control in the silent mode shown in FIG. 5 is executed (S1407).

If the command to activate the air-conditioner 6 is not inputted from the air-conditioner remote controller 9, it is determined whether the air-conditioner controller 8 is already activated (S1408). If the air-conditioner controller 8 is activated, then the air-conditioner controller 8 is stopped (S1409), the compressor power-supply switch 104 is opened, and the power from the battery 90 is shut off (S1410).

In this manner, if it is determined at step S1406 that the passenger is not proximate or if the control in the silent mode is executed at step S1407, if the compressor power-supply switch 104 is turned off at step S1410, or if it is determined at step S1408 that the air-conditioner controller 8 is not activated, it is determined whether the start command is inputted from the vehicle starter/stopper 102 (S1411). If the start command is inputted, it is determined whether the driving power-supply switch 103 and the compressor power-supply switch 104 are turned on (S1412). If the start command is inputted, it is determined whether the driving power-supply switch 103 and the compressor power-supply switch 104 are not connected, then the driving power-supply switch 103 and the compressor power-supply switch 104 are connected (turned on) (S1413), the driving inverter 92 is activated (S1414), and the return control shown in FIG. 8 is executed (S1415).

If the return control is executed at step S1415 or the driving power-supply switch 103 and the compressor power-supply switch 104 are connected at step S1412, then the start command to the air-conditioner 6, which the air-conditioner controller 8 receives from the air-conditioner remote controller 9, is changed to OFF (S1416), the passenger-proximity status is set to a status in which the passenger is not proximate (S1417), and the vehicle air-conditioner control system according to the present embodiment thereby finishes the power-supply control.

If the start command is not inputted from the vehicle starter/stopper 102 at step S1411, it is determined whether the driving inverter 92 is stopped (S1418). If the driving inverter 92 is stopped, the vehicle air-conditioner control system according to the present embodiment thereby finishes the power-supply control. If the driving inverter 92 is not stopped, then the driving inverter 92 is stopped (S1419), the driving power-supply switch 103 and the compressor power-supply switch 104 are opened (turned off) (S1420), and the vehicle air-conditioner control system according to the present embodiment thereby finishes the power-supply control.

As described above, the vehicle air-conditioner control system according to the present embodiment includes the compressor power-supply switch 104 that opens or closes a connection between the vehicle power supply and the air-conditioner 6 and the driving power-supply switch 103 that opens or closes a connection between the vehicle power supply and the vehicle driving system. If the air-conditioner 6 is activated by the air-conditioner remote controller 9, only the compressor power-supply switch 104 is connected and turned on. Due to this, even if an insulation state of driving-system equipment that uses high voltage is insufficient, no high voltage is supplied at the time of passenger boarding, so that current leakage can be avoided.

Fourth Embodiment

Figure 15:
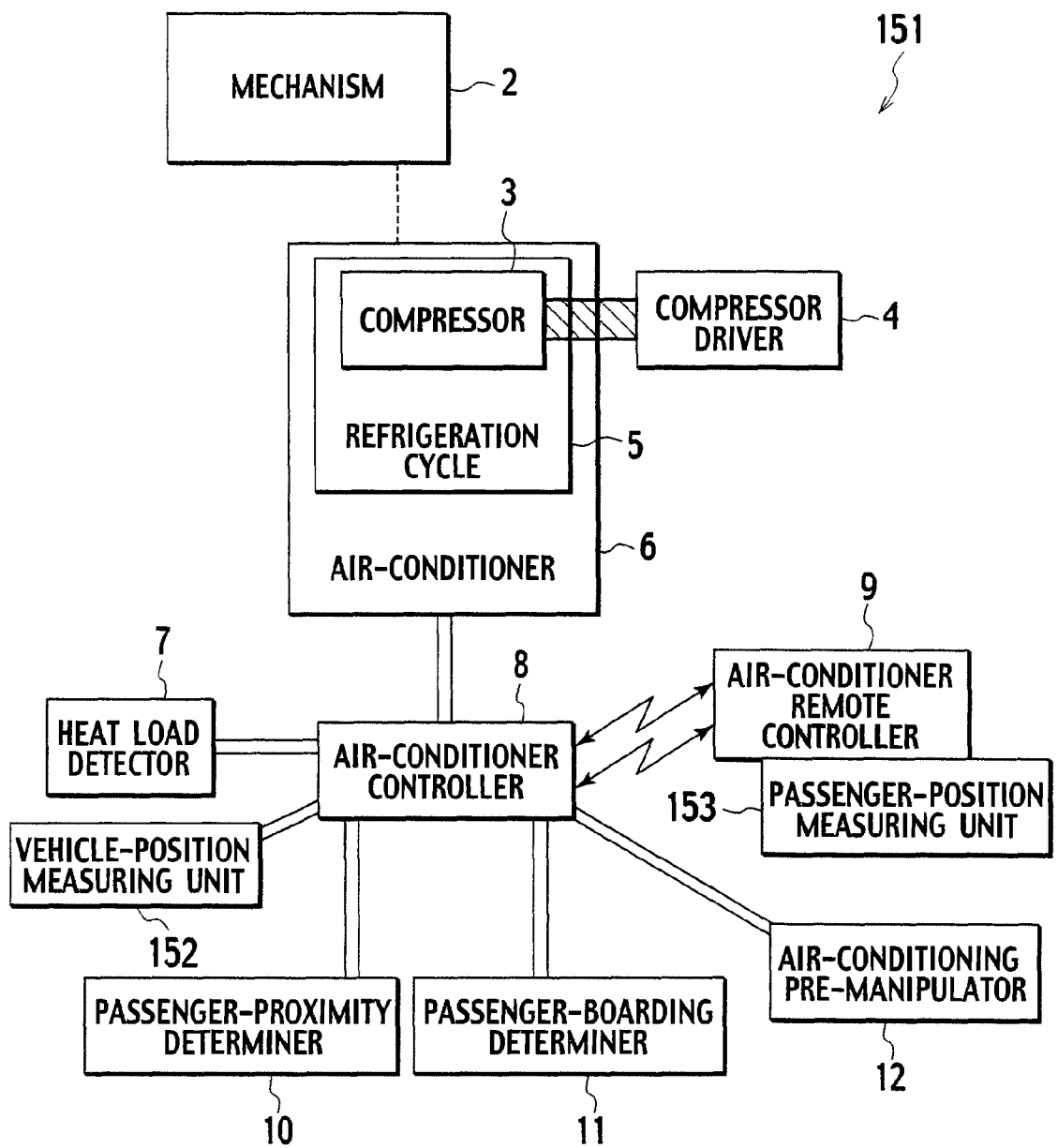
FIG. 15 is a block diagram showing a configuration of a vehicle air-conditioner control system according to a fourth embodiment of the present invention.

A fourth embodiment of the present invention will be explained with reference to the drawings. FIG. 15 is a block diagram showing a configuration of a vehicle air-conditioner control system according to the present embodiment.

As shown in FIG. 15, differently from the first embodiment, a vehicle air-conditioner control system 151 according to the present embodiment additionally includes a vehicle-position measuring unit 152 (vehicle-position measurement unit) that detects a position of a vehicle using GPS (global positioning system), a passenger-position measuring unit 153 (passenger-position measurement unit) that detects a position of a passenger by means of a position detecting function using a radio wave of a cellular phone. The other constituent elements of the vehicle air-conditioner control system 151 according to the present embodiment are identical with those according to the first embodiment, detailed explanations thereof will be omitted.

The passenger-position measuring unit 153 can detect the position of the passenger using the GPS if it is a portable device having the GPS function mounted therein. Furthermore, distance accuracy can be improved by calculating a distance between the passenger and the vehicle on the road from GPS information and map data recorded in a CD, a DVD, a hard disk, or a base station-side server acquired by communication.

Figure 16:
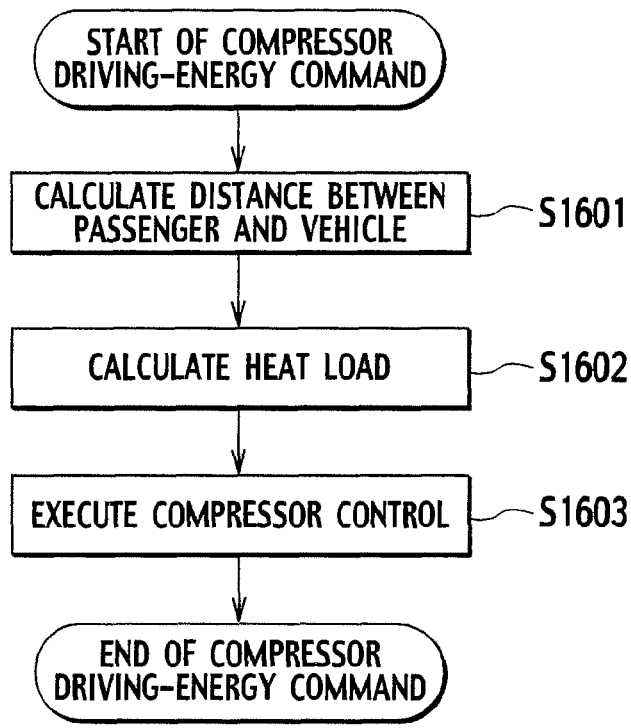
FIG. 16 is a flowchart showing an air-conditioner control process performed by the vehicle air-conditioner control system according to the fourth embodiment.

An air-conditioner control process performed by the vehicle air-conditioner control system according to the present embodiment will be explained with reference to the flowchart of FIG. 16.

First, the air-conditioner controller 8 calculates the distance between the vehicle and the passenger based on the position of the vehicle measured by the vehicle-position measuring unit 152 and the position of the passenger measured by the passenger-position measuring unit 153 (S161). To calculate this distance, a well-known method employed in a navigation system that obtains the position of the vehicle by means of the GPS or the like can be used.

Next, the heat load detector 7 detects a heat load index based on such data as solar radiation, target compartment temperature, present compartment temperature, and outdoor air temperature (S1602). The heat load detector 7 detects, for example, an opening of an air mix door 26 as this heat load index. The opening of the air mix door 26 is such that if the opening of the air mix door 26 is, for example, 0%, the air-conditioning wind to a heater core 25 is shut off and that if the opening of the air mix door 26 is 10%, the air-conditioning wind is entirely supplied to the heater core 25.

While the opening (control value) of the air mix door 26 is controlled to fall within a range of 0% to 100%, a signal (control command value) for controlling the air mix door opening is outputted in a wider range (−50% to 150%) than the former range. Namely, if the control command value for the air mix door opening is −50%, the control value is equal to the door opening of 0%, and if the control command value for the air mix door opening is +150%, the control value is equal to the door opening of 100%.

The control command value sometimes becomes a numeric value other than 0% to 100%, depending on environmental conditions such as the outdoor air temperature. However, if the calculated numeric value exceeds the control value, then an air-conditioner ECU automatically limits upper and lower limits, sets the control value to 0% to 100%, and outputs the control value to an actuator.

After step S1602, the air-conditioner controller 8 executes compressor control based on the calculated distance between the passenger and the vehicle and the heat load index (S1603).

Figure 17:
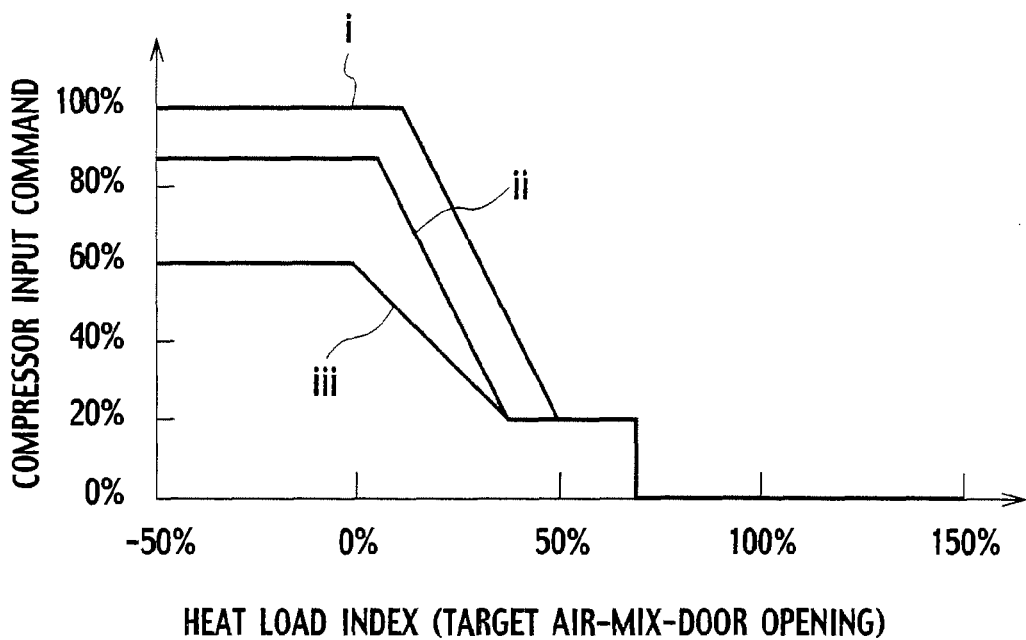
FIG. 17 is an explanatory diagram of compressor control performed by the vehicle air-conditioner control system according to the fourth embodiment.

The compressor control at step S1603 will be explained with reference to FIG. 17. As shown in FIG. 17, in this compressor control, control diagrams are prepared for a case (i) where the distance between the passenger and the vehicle is short, a case (ii) where the distance is medium, and a case (iii) where the distance is long, respectively. One of the control diagrams is selected based on a result of the distance calculation, and a compressor input command is outputted based on the heat load index.

Distances between the passenger and the vehicle are classified into, for example, a short distance within 100 m, a medium distance between 100 m and 500 m, and a long distance equal to or larger than 500 m. One control diagram is selected based on this distance classification, and the compressor input command is obtained based on the command value of the target air mix door opening that is the heat load index. The compressor input command is represented by a rate (%) if a maximum value of compressor input energy is 100%.

As shown in FIG. 17, by thus executing the compressor control, if the distance is short, the compressor input command is set high so as to be able to warm or cool the vehicle as soon as possible, and if the distance is long, the compressor input command is set low to execute an efficient operation even with the same air mix opening. This can minimize battery consumption. The control diagrams are not limited to those shown in FIG. 17, but can be changed to optimum control diagrams according to the heat load or the like to execute the compressor control.

If the compressor control is executed, the vehicle air-conditioner control system 151 according to the present embodiment finishes the air-conditioner control process.

As described above, the vehicle air-conditioner control system 151 according to the present embodiment further includes the vehicle-position measuring unit 152 that detects the position of the vehicle and the passenger-position measuring unit 153 that detects the position of the passenger, calculates the distance between the vehicle and the passenger based on the detection results of the vehicle-position measuring unit 152 and the passenger-position measuring unit 153, and controls the air-conditioner 6 based on the calculated distance and the heat load. It is, therefore, possible to accurately estimate the time until the passenger boards the vehicle to control the air conditioning, and to set the vehicle compartment in a comfortable air-conditioned state before the passenger is onboard.

The vehicle air-conditioner according to the present invention has been explained so far based on the embodiments shown in the drawings. However, the present invention is not limited to the embodiments and the configuration of each component can be replaced by an arbitrary configuration with similar functions.

For example, according to the present invention, the compressor is used as a high-pressure refrigerant generator in a cooler. Alternatively, the refrigeration cycle can be changed to a cycle that can also perform a heating cycle, and the compressor can be used as a high-pressure refrigerant generator for a heating heat source.

Moreover, the compressor driver 4 can be a so-called closed electric compressor accommodated in the same housing as that for the compressor, or can be an external motor-driven electric compressor accommodated in a different housing from that for the compressor and transmitting power using a mechanical transmission mechanism. Furthermore, the compressor driver 4 can be a type (hybrid compressor) a main driving source of which is transmission of the engine power by a belt or the like and which uses an electric motor as an auxiliary motor.

Further, according to the present invention, the method of cooling the vehicle mainly by the refrigerant heat generated by the compressor has been explained. Alternatively, the compressor can be combined with a compartment-air ventilating unit such as the indoor-outdoor air changeover door 23 or the blower fan 24 shown in FIG. 2 to cool the vehicle.

Moreover, the communicating unit is not limited to the cellular phone or the remote controller. Alternatively, a device that can transmit and receive signals over the Internet can be disposed in the vehicle and the air-conditioner can be remotely controlled using an Internet communicating unit deposed in a home or an office.

(US Designated Application)

The present international patent application relates to a US designated application, and claims the benefit of priority under 35 U.S.C. 119(a) from Japanese Patent Application No. 2005-256383, filed Sep. 5, 2005 (filing date: Sep. 5, 2005), and the disclosure of which is incorporated herein.

The invention claimed is:

1. A vehicle air-conditioner control system for controlling a temperature of a compartment of a vehicle, comprising:
   an air conditioner configured to adjust the temperature of the compartment;
   a heat-load detector detecting a heat load imposed on the vehicle;
   an air-conditioner remote controller configured to remotely control the air conditioner according to a passenger of the vehicle;
   a passenger-proximity determiner configured to determine whether the passenger is proximate to the vehicle; and
   an air-conditioner controller configured to control the air conditioner based on the heat load if the air-conditioner remote controller activates the air conditioner before the passenger is onboard, and to control the air conditioner to be set in a silent mode if the passenger-proximity determiner determines that the passenger is proximate to the vehicle.

2. The vehicle air-conditioner control system according to claim 1, wherein the passenger-proximity determiner determines that the passenger is proximate in one of a case where the passenger opens a door of the vehicle, a case where the door is unlocked, and a case where it is determined by a communication with a remote controller carried by the passenger that the passenger is proximate.

3. The vehicle air-conditioner control system according to claim 1, wherein the silent mode set by the air-conditioner controller is to stop or reduce an air-conditioning wind.

4. The vehicle air-conditioner control system according to claim 1, wherein the silent mode set by the air-conditioner controller is to zeroes or reduce number of revolutions of a compressor included in the air conditioner.

5. The vehicle air-conditioner control system according to claim 1, wherein the air-conditioner remote controller is disposed in one of a cellular phone, a vehicle remote controller, and an apparatus that can transmit and receive signals over the Internet.

6. The vehicle air-conditioner control system according to claim 1, further comprising:
   a pre-manipulator of the air-conditioner configured to activate the air-conditioner when it is a predetermined time set by the passenger or the predetermined time set by the passenger has passed.

7. The vehicle air-conditioner control system according to claim 1, further comprising:
   a passenger-boarding determiner configured to determine whether the passenger is onboard, wherein
   if the passenger-boarding determiner determines that the passenger is onboard, the air-conditioner controller controls the air conditioner to be set in a return mode for returning the air conditioner from the silent mode to an air-conditioned state preset by the passenger.

8. The vehicle air-conditioner control system according to claim 1, further comprising;
a power-supply switch configured to open or close a connection to a member that supplies a high voltage in a power supply of the vehicle, wherein
if the passenger-proximity determiner determines that the passenger is proximate to the vehicle, the power-supply switch shuts off the connection to the power supply.

9. The vehicle air-conditioner control system according to claim 1, further comprising:
a power-supply switch for the air conditioner configured to open or close a connection between a power supply of the vehicle and the air conditioner; and
a driving power-supply switch configured to open or close a connection between the power supply of the vehicle and a driving system of the vehicle, wherein
if the air-conditioner remote controller activates the air conditioner, only the power-supply switch for the air conditioner is connected.

10. The vehicle air-conditioner control system according to claim 1, further comprising:
a vehicle-position measuring unit configured to detect a position of the vehicle; and
a passenger-position measuring unit configured to detect a position of the passenger, wherein
the air-conditioner controller calculates a distance between the vehicle and the passenger based on detection results of the vehicle-position measuring unit and the passenger- position measuring unit, and controls the air conditioner based on the calculated distance between the vehicle and the passenger and the heat load detected by the heat-load detector.

* * * * *